3,793,430
HYDROMETALLURGICAL TREATMENT OF NICKEL, COBALT AND COPPER CONTAINING MATERIALS

David Weston, 34 Parkwood Ave.,
Toronto, Ontario, Canada
No Drawing. Continuation-in-part of application Ser. No. 260,991, June 8, 1972, which is a continuation-in-part of application Ser. No. 221,437, Jan. 27, 1972, which in turn is a continuation-in-part of application Ser. No. 869,376, Oct. 24, 1969, now abandoned. This application May 31, 1973, Ser. No. 365,626
Int. Cl. C22b 3/00
U.S. Cl. 423—36        18 Claims

ABSTRACT OF THE DISCLOSURE

A process for the recovery by leaching of nickel, cobalt and copper using sulphuric acid and employing agents capable of introducing alkali metal ion or ammonium ion to the pulp whereby the dissolution of desired metals is controlled and the iron content of the solution is reduced to a low level. The leaching may be carried out at temperatures and pressures below or above atmospheric pressure and the atmospheric boiling point of the pulp.

---

This application is a continuation-in-part of my prior application Ser. No. 260,991 filed June 8, 1972 which was a continuation-in-part of my application Ser. No. 221,437, filed Jan. 27, 1972 which was a continuation of application Ser. No. 869,376, filed Oct. 24, 1969, now abandoned.

THE BACKGROUND OF THE INVENTION

This invention relates to the hydrometallurgical treatment of materials for the recovery of nickel, cobalt and copper. Materials susceptible to treatment according to the invention include nickel bearing laterite ores, nickel and copper bearing sea-nodule deposits, nickel or copper mineral treated products such as concentrated nickel or copper ores and other ores or smelter and roaster products where nickel, cobalt or copper or any combination of these minerals or products are associated with iron and are susceptible to leaching with sulphuric acid, and material from tailings dumps which contain residual quantities of copper.

Attempts to recover nickel and cobalt from the nickel laterites by hydrometallurgical processes such as leaching have been hindered by the presence in the laterites of a substantial amount of iron mineral such as geothite and hematite together with complex host rock iron minerals. When subjected to a sulphuric acid leaching, for example, part of the iron readily goes into solution where it has the effect firstly of causing excessive sulphuric acid consumption and secondly of preventing more than a certain proportion of the nickel and cobalt present from going into solution. Once the iron is in solution it is very difficult and costly to separate the nickel and cobalt from the iron. This situation has resulted in commercial exploitation of the nickel laterites being generally confined to the production of ferro-nickel and in the use of pyrometallurgy and other expensive treatment steps in combinations with hydrometallurgy to reduce the iron content to an acceptably low value in the final ferro-nickel product. These processes generally employ complex flow sheets which are expensive to operate and require a high capital cost outlay.

SUMMARY OF THE INVENTION

I have now found that it is possible, by properly controlling conditions and the addition of certain reagents, to conduct a leaching process in which the nickel and cobalt are effectively dissolved while the iron is prevented from remaining in the solution, whereby a pregnant liquor is produced containing a high proportion of the cobalt and nickel present in the original lateritic ore and with a nickel to iron ratio down to as low as 50 nickel to 1 iron, from which pregnant liquor the cobalt and nickel are readily recoverable by known processing methods including, for instance, ion exchange. I have further found that such leaching techniques apply equally well to the recovery of copper and nickel values in a variety of materials from which such values were thought to be economically unrecoverable because of low grade, the presence of sulphuric acid soluble iron, and the supposed insolubility of the mineral values and the like.

According to my invention the laterite nickel ore or other material is comminuted to a suitable degree of fineness for leaching which will generally be from a 28 mesh grind to about 90% minus 325 mesh and formed into a pulp of suitable consistency which would normally be as high as solids as can effectively be handled during the cominution stage. Where a dispersing agent is employed during comminution this pulp density may be as high as 60% by weight solids whereas without a dispersing agent it may be necessary to go as low as 25% by weight solids. The pulp is then subjected to a first leaching stage with the addition of sufficient sulphuric acid to bring the pH down to a value below about 1.5 and preferably below about 0.7 and the leaching is allowed to proceed at atmospheric pressure and temperatures varying from 70° C. to the boiling point of the pulp, or if desired, and pressure equipment is economically justified at higher temperatures and pressures. This leaching stage is permitted to continue until there is a substantial concentration of iron in the solution. For instance, at a pulp density of 45% by weight solids my preferred concentration of iron is approximately 25 grams per litre of solution, which point is generally reached, in leaching carried out below the atmospheric boiling point, after a period of approximately 16 hours. It will be appreciated that the laterites vary over a wide range in both their iron and rock content. For instance, the normal variation in the laterites is approximately 10% by weight iron to a maximum of 45% by weight iron. The optimum conditions of my leaching process will therefore change, within limits, depending upon the chemical composition of the laterite being treated. When the above condition has been reached, I then add to the pulp a precipitating agent for the iron in stage additions during the remainder of the leach, in quantities sufficient to cause controlled precipitation of the iron from the solution. When I use sodium chloride, potassium chloride, or a mixture of the two salts, I prefer to add all of these salts prior to or at the start of the leaching process. As precipitating agents I may use any agent capable of introducing alkali metal or ammonium ions to the pulp. My preferred agents are potassium carbonate, sodium carbonate, sodium chloride and potassium chloride. While potassium carbonate appears to be the most effective, it is relatively high in price compared to sodium carbonate and this in many cases indicates the use of the latter for economic reasons. Similarly, potassium chloride is more expensive than sodium chloride, although more effective. While the indications are that all alkali metals will produce the precipitation phenomenon, I exclude from consideration rubidium and caesium on obvious economic grounds. I may also use sodium sulphate, potassium nitrate or combinations of these reagents with sodium or potassium carbonate and chloride. It is beneficial in some cases to carry out the leach in the presence of an oxidizing agent which may also act as a precipitating agent.

Generally speaking, for a particular process the choice of precipitating agent will be governed by economic factors. For instance, where the treating plant is located near the ocean, in certain applications I may use sea water for the formation of my pulp and eliminate or reduce materially the amount of sodium or potassium carbonate or chloride. This is particularly true in the treatment of sea nodules containing copper and nickel.

The leach is continued until the desired economic level of solution of metal values has been attained and at this point if the iron content of the solution is not at a usefully low level, further precipitating agent is added to complete the precipitation and bring the iron content of the solution down to the desired level.

While I have indicated that the purpose of my initial stage of leaching is to bring a desired amount of iron into solution and that the addition of the precipitating agent for iron usually follows this first stage, I have found that with the slower acting of the precipitating agents, such as sodium chloride, sodium sulphate and the like, the addition of all or a certain quantity of these reagents during the comminuting process, or prior to sulphuric acid addition, will not prevent the concentration of iron in solution from reaching a desired level for optimum nickel and cobalt iron dissolution and I prefer in many cases to make such additions during the comminution of the ore in order to decrease the amount of relatively more expensive, faster acting precipitating agents which may be added at subsequent stages of leaching. Further, small increments of the precipitating agent or agents may be added either to the grinding stage or during the primary leaching stage.

As it is desirable to work at as high pulp density as possible in order to control the sulphuric acid consumption and minimize plant size. I prefer to carry out the comminution with the addition of a dispersing agent or a wetting agent or both. Among the available dispersing agents, I prefer sodium silicate because of its ready availability and relatively low cost. Any wetting agent which is a powerful lowerer of surface tension and has low frothing characteristics is suitable.

The leach described generally above may be modified if desired by the introduction of various gaseous media. For instance, I have found that the introduction of sulphur dioxide accelerates both the iron and cobalt dissolution. Carbon dioxide on the other hand retards iron and cobalt dissolution and accelerates nickel dissolution. The introduction of air accelerates iron dissolution, retards iron deposition and cobalt and nickel dissolution. Thus, while the introduction of gaseous media to the leach is not an essential feature of my process, in certain instances useful additional control of the process may be achieved with possibly some saving in operational costs, due to shortened time or reduction in acid consumption. This will be particularly true of carbon dioxide where waste combustion gases could be beneficially introduced into the leach.

If as a precipitating agent a strong oxidizing agent such as potassium dichromate is employed, the rate of deposition of iron is strongly accelerated.

It is important that the rate of deposition of the iron be such that the concentration of iron in the solution does not drop below a certain value until the dissolution of nickel and cobalt has approached its desired end point since it appears that the dissolution rate of nickel and cobalt is adversely affected if the amount of iron in solution falls below about 1 gram per liter. However, the optimum balance between the rate of iron deposition and the dissolution rate for cobalt and nickel will depend upon the composition of the ore being treated and will vary between laterites of different chemical composition. The results which I have achieved on the laboratory scale indicate that by using the process of the present invention recoveries of higher than 80% of the nickel and cobalt may be obtained in the pregnant solution concurrently with the final pregnant solution containing little more than a trace of iron.

My invention also comprehends the carrying out of the process at temperatures above the atmospheric boiling point of the pulp inasmuch as the chemical phenomena associated with dissolution of the desired mineral values follow the same pattern at higher temperatures and pressures and the normal acceleration of the dissolution rate associated with rises in temperature applies. Thus, although the use of high temperatures and pressures involves the use of costly pressure equipment and places physical limitations on the manipulative procedures involved, the resulting shortening of total leaching time to obtain a desired degree of dissolution and the fact that a coarser grind may be tolerated may economically outweigh the disadvantages of having to employ pressure equipment. In cases where the higher temperature and pressures are justified it is an advantageous feature of the invention that the final deposition of iron may be carried out at atmospheric pressure after the desired degree of dissolution of metal values has been achieved at the higher temperatures and pressures.

EXAMPLES OF THE OPERATION OF THE INVENTION

The following examples illustrate the invention. In all of the examples except as otherwise noted the same apparatus was employed which consisted of a laboratory ball mill for comminuting the ores, a constant temperature thermostatically controlled oil bath equipped with approximately 2 liter sealable glass pots equipped with motor driven stirring devices and two pH meters equipped with special electrodes for accurate high temperature low pH readings. Samplings were taken by means of 50 and 25 cc. pipettes at prescribed intervals. The progress of cobalt and nickel dissolution was followed by analyzing the solids for undissolved cobalt and nickel. Iron in solution and the final cobalt and nickel in solution was determined by standard quantitative analysis. All manipulative procedures were standardized throughout.

EXAMPLE I

A sample of Penarroya New Caledonia lateritic nickel ore had the following head analysis:

| | Percent by wt. |
|---|---|
| Ni | 1.38 |
| Co | 0.092 |
| Total Fe | 41.5 |
| MgO | 3.75 |
| $Al_2O_3$ | 4.25 |
| $SiO_2$ | 7.40 |

535 grams of this ore (estimated 515 to 520 grams dry) were ground for 15 minutes in the laboratory ball mill at a pulp density of 30% by weight solids, with the addition of 10 cc. of 1% solution of a wetting agent (a trimethyl nonyl ether of polyethylene glycol) and 16 grams of sodium silicate. The resulting pulp was transferred to a testing pot on the oil bath at approximately 90° C. and conditioned for 20 hours at which time the addition of 120 cc. of 10% by weight C.P. sulphuric acid reduced the pH of the pulp to 0.8. The conditioning was continued for 20 hours, a sample was taken for analysis and 15 grams of dry crystalline potassium carbonate was added to the pulp. An additional quantity of 5 grams of potassium carbonate was added every two hours until a total of 30 grams had been added. 20 hours after the first addition of potassium carbonate, a second sample was taken for analysis 15 grams of potassium carbonate were added and each two hours thereafter an additional 5 grams of potassium carbonate were added until the total addition for this stage had reached 30 grams. 24 hours after the second addition of potassium carbonate was commenced, a sample was taken for analysis and samples were taken at 24 hour intervals thereafter.

The following were the metallurgical results:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time hrs.: |  |  |  |  |  |
| 20 | 1.30 | 0.072 | 28.8 |  | 0.8 |
| 40 | 0.63 | 0.036 | 1.54 |  | 1.4 |
| 64 | 0.58 | 0.033 | 1.00 |  | 2.10 |
| 88 [1] | 0.59 | 0.032 | 0.15 |  | 2.10 |
| 112 | 0.46 | 0.031 | 0.64 |  | 1.80 |
| 136 | 0.43 | 0.030 | 0.28 | 2.28 | 1.90 |

[1] 20 cc. C.P. $H_2SO_4$ were added after sample was taken.

It is to be noted that after 64 hours the iron in solution had fallen to 0.10 gms./l. and that after 88 hours the iron in solution was still only 0.15 gms./l. whereas the nickel and cobalt disolution showed no improvement for the past 24 hours. The addition of sulphuric acid at this point can be seen to have brought the iron in solution up to 0.64 gms./l. enabling the dissolution of nickel and cobalt to proceed.

EXAMPLE II

A 835 gram sample of the same ore as that used in Example I was ground for 25 minutes in a laboratory ball mill at a pulp density of approximately 50% by weight solids in the absence of any reagents following which the resulting pulp was transferred to a testing pot on the oil bath where 200 cc. of C.P. sulphuric acid were added to reduce the pH of the pulp to 0.7. A temperature of approximately 90° C. was maintained and the pulp was conditioned for 20 hours at which time a sample was withdrawn for analysis. Six liters of air per hour were then introduced to the pulp and the conditioning was continued for 20 hours at the end of which time a sample was taken for analysis, following which the air was turned off and 25 grams of dry crystalline sodium sulphate were added to the pulp followed by a further 25 grams three hours later. Twenty hours after the first addition of sodium sulphate a sample was taken for analysis and 25 grams of sodium sulphate were added followed four hours later by a further 25 grams. The conditioning was continued for 24 hours when a sample was taken for analysis. After a final conditioning period of another 24 hours, a further sample was taken for analysis.

The following were the metallurgical results:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 1.22 | 0.070 | 49.2 |  | 0.7 |
| 40 | 1.07 | 0.065 | 58.3 |  | 1.1 |
| 60 | 0.65 | 0.035 | 31.9 |  | 0.9 |
| 84 | 0.48 | 0.025 | 9.70 |  | 1.2 |
| 108 | 0.37 | 0.025 | 11.3 |  | 1.20 |

These results indicate the accelerating effect of the introduction of air upon the solution rate of iron and also indicate that the action of sodium sulphate as a deposition agent is relatively mild compared to that of potassium carbonate as indicated in Example I.

EXAMPLE III

A further sample of 835 grams of the same ore as that used in Examples I and II was ground for 15 minutes in a laboratory ball mill at a pulp density of approximately 25% by weight solids in the absence of any reagents following which the resulting pulp was transferred to a testing pot on the oil bath at a temperature of approximately 90° C. and 120 grams of sodium chloride was added following which the pulp was conditioned for 24 hours and a sample was taken for analysis. After a further period of conditioning for 20 hours a second sample was taken for analysis and 225 cc. of C.P. sulphuric acid was added and conditioning was continued for a further 20 hours and a further sample was taken for analysis. 25 grams of dry crystalline potassium carbonate were then added to the pulp and conditioning was continued for 24 hours when a sample was taken for analysis. After a further 24 hours of conditioning, the final sample was taken for analysis. The metallurgical results were as follows:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 24 | 1.27 | 0.092 | 0.2 |  | 5.85 |
| 44 | 1.25 | 0.090 | 0.1 |  | 5.90 |
| 64 | 0.72 | 0.054 | 29.6 |  | 0.6 |
| 88 | 0.33 | 0.029 | 2.80 |  | 1.05 |
| 112 | 0.26 | 0.026 | 1.54 |  | 1.2 |

This test illustrates that initial introduction of sodium chloride does not prevent an acceptable rate of iron dissolution when sulphuric acid is added subsequently and it shows furthermore that a relatively smaller amount of potassium carbonate will under these conditions produce a satisfactory deposition of the iron and dissolution of the nickel and cobalt.

EXAMPLE IV

A 540 gram sample of lateritic nickel ore supplied by the International Nickel Company of Canada, and having a head analysis of 1.42% by weight nickel, 0.126% by weight cobalt and 42.2% by weight iron, was ground in a laboratory ball mill at a pulp density of approximately 30% by weight solids in the presence of 75 grams of sodium chloride. The resulting pulp was transferred to a testing pot on the oil bath at a temperature of approximately 90° C. and the pulp was conditioned for 2 hours at which time 150 cc. of C.P. sulphuric acid were added and the pulp was conditioned for a period of 20 hours following which a sample was taken for analysis and the pulp was conditioned for a further 20 hours following which a further sample was taken for analysis. Five grams of potassium carbonate were added to the pulp and the pulp was conditioned for a further 20 hours when a further sample was taken for analysis and 11 grams of potassium carbonate were added to the pulp. After 24 hours of further conditioning a further sample was taken for analysis and 4 grams of potassium carbonate were added to the pulp and the pulp was conditioned for a further 24 hours before a final sample was taken for analysis. The metallurgical results were as follows:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 0.71 | 0.047 | 12.4 |  | 0.75 |
| 40 | 0.71 | 0.048 | 3.50 |  | 0.95 |
| 60 | 0.38 | 0.025 | 0.84 |  | 1.35 |
| 84 | 0.34 | 0.023 | 0.37 | 2.90 | 1.40 |
| 108 | 0.30 | 0.021 | 0.21 | 3.10 | 1.40 |

These results indicate that sodium chloride is effective as a deposition agent and when followed with relatively small stage additions of potassium carbonate results in a very effectiveq combination of iron deposition and nickel and cobalt dissolution.

EXAMPLE V 870 grams of a sample of lateritic ore supplied by the International Nickel Company of Canada and having a head analysis of 1.42% by weight nickel, 0.126% by weight cobalt and 42.2% by weight iron, was ground for 25 minutes in a laboratory ball mill at a pulp density of 45% by weight solids in the presence of 32 grams of sodium silicate. The pulp was transferred to a testing pot on the oil bath at a temperature of approximately 90° C. and after 4 hours conditioning, 120 grams of sodium chloride were added and the pulp was further conditioned for 20 hours. 225 cc. of C.P. sulphuric acid was added, conditioning was continued for 20 hours and a sample was taken for analysis. 10 grams of potassium carbonate was added and conditioning was continued for a further 20 hours. A sample was taken for analysis, 8 grams of potassium carbonate were added and the pulp was conditioned for a further 24 hours following which a further sample was taken for analysis and a further 4 grams of potassium carbonate added. Conditioning was continued for 48 hours with samples taken at 24 hour intervals.

The metallurgical results were as follows:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 0.66 | 0.046 | 10.2 |  | 0.75 |
| 40 | 0.38 | 0.046 | 0.96 |  | 1.15 |
| 64 | 0.33 | 0.205 | 0.47 |  | 1.40 |
| 88 | 0.30 | 0.025 | 0.37 | 5.85 | 1.60 |
| 112 | 0.27 | 0.022 | 0.26 | 6.05 | 1.65 |

This test shows the effectiveness of the combination of sodium silicate and salt followed by relatively small additions of potassium carbonate in stages.

EXAMPLE VI

Another 870 gram sample of the same ore used in Example V was ground in a laboratory ball mill for 25 minutes at a pulp density of 45% by weight solids in the presence of 32 grams of sodium silicate. The pulp was then transferred to a testing pot on the oil bath at a temperature of approximately 90° C. and after 4 hours conditioning 120 grams of sodium chloride were added and the pulp was further conditioned for a period of 20 hours. 225 cc. of C.P. sulphuric acid were added and the conditioning was continued for 20 hours and a sample was taken for analysis. 10 grams of crystalline sodium sulphate were added and the conditioning was continued for a further 20 hours and a sample was taken for analysis. A second quantity of 10 grams of sodium sulphate were added and the conditioning was continued for 24 hours and a further sample was taken for analysis. A further addition of 6 grams of sodium sulphate was made, the conditioning was continued a further 24 hours and a sample was taken for analysis.

The metallurgical results were as follows:

|  |  |  | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 0.62 | 0.043 | 6.58 |  | 0.75 |
| 40 | 0.53 | 0.037 | 1.81 |  | 1.05 |
| 64 | 0.42 | 0.029 | 2.10 |  | 1.20 |
| 88 | 0.40 | 0.027 | 1.20 | 6.87 | 1.35 |

This test shows the effectiveness of sodium sulphate as a deposition agent permitting good dissolution of the cobalt and nickel while bringing the iron in solution down to an acceptable level. Repetitions of the same procedure employing ammonium carbonate in the one case and lithium carbonate in another case indicated that these two compounds act as deposition agents in substantially the same manner as sodium sulphate.

EXAMPLE VII 540 grams of the same ore as that employed in Examples V and VI were ground for 15 minutes in the laboratory ball mill at 30% by weight solids following which the pulp was transferred to a testing pot on the oil bath at a temperature of approximately 90° C., 150 cc. of C.P. sulphuric acid were added and the pulp was conditioned for a period of 20 hours following which a sample was taken for anaylses. 12.5 grams of potassium nitrate were added, the conditioning was continued for 20 hours and a further sample was taken for analysis. A further quantity of 12.5 grams of potassium nitrate were added to the pulp, conditioning was continued for a further 20 hours and a further sample was taken for analysis. A further 12.5 grams of potassium nitrate were added, the pulp sample was taken for analysis after 24 hours and after continuing with the conditioning for a further 24 hours a final sample was taken for analysis.

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 1.03 | 0.060 | 42.2 |  | 0.85 |
| 40 | 0.87 | 0.046 | 28.1 |  | 0.85 |
| 60 | 0.69 | 0.037 | 19.5 |  | 1.10 |
| 84 | 0.58 | 0.033 | 9.50 | 2.63 | 1.00 |
| 108 | 0.41 | 0.023 | 3.26 | 2.90 | 1.00 |

This test indicates the ability of potassium nitrate to act as a deposition agent in the process of the invention.

EXAMPLE VIII

An 835 gram sample of the ore used in Example I was ground for 25 minutes in the laboratory ball mill at a pulp density of approximately 50% by weight solids and the pulp was transferred to a testing pot on the oil bath at a temperature of approximately 90° C., 200 cc. of C.P. sulphuric acid were added and the pulp was conditioned for 20 hours and a sample was taken for analysis. 25 grams of potassium carbonate were then added followed by a further 25 grams 4 hours later. 20 hours after the first addition of potassium carbonate, a sample was taken for analysis and the pulp was conditioned a further 20 hours, a sample was taken for analysis and 25 grams of potassium dichromate were added followed 4 hours later by 25 grams of potassium carbonate. An extra sample was taken for analysis 3 hours following the addition of the potassium dichromate. Conditioning was continued and a sample was taken for analysis at 24 hour intervals, with 25 cc. of C.P. sulphuric acid added after the last addition of potassium carbonate.

The metallurgical results were as follows:

|  | Percent by weight | | Pregnant solution | | |
| --- | --- | --- | --- | --- | --- |
|  | Ni (in solids) | Co (in solids) | Fe, gms./l. | Ni, gms./l. | pH |
| Time, hrs.: |  |  |  |  |  |
| 20 | 1.08 | 0.070 | 49.6 |  | 0.7 |
| 40 | 0.57 | 0.034 | 2.82 |  | 1.45 |
| 60 | 0.51 | 0.033 | 0.92 |  | 1.9 |
| 63 | 0.50 | 0.031 | 0.20 |  |  |
| 88 | 0.47 | 0.032 | 0.21 |  | 1.9 |
| 112 | 0.38 | 0.031 | 0.50 |  | 1.7 |
| 136 | 0.34 | 0.028 | 0.36 | 4.25 | 1.85 |

The foregoing results illustrate the accelerating effect that potassium dichromate has upon the deposition of iron where the iron in solution fell from 0.92 to 0.20 gram per liter in the first 3 hours following the first addition of potassium dichromate.

EXAMPLE IX

An 835 gram sample of nickel ore supplied by International Nickel Company of Canada and having a head analysis of 1.42% by weight nickel, 0.126% by weight cobalt and 42.2% by weight iron was ground in the laboratory ball mill for 30 minutes at a pulp density of 50% by weight in the presence of 200 cc. of a 10% solution of sodium silicate, 15 cc. of a 1% solution of wetting agent (a trimethyl nonyl ether of polyethylene glycol) and 20 grams of sodium carbonate. The pulp was then transferred to a testing pot on the oil bath at approximately 90° C. and conditioned for 4 hours when 165 cc. of C.P. sulphuric acid were added together with 10 grams of sodium carbonate. The pulp was conditioned for 16 hours, a sample was taken for analysis and 5 grams of sodium carbonate were added. Conditioning was continued for 12 hours and a sample was taken for analysis and 50 grams of sodium carbonate were added. Conditioning was continued and samples were taken for analysis every 12 hours. In this example, the iron content of the solids was determined by chemical analysis.

The metallurgical results were as follows:

| Time hrs.: | Percent by weight | | | Pregnant solution | |
|---|---|---|---|---|---|
| | Ni (in solids) | Co (in solids) | Fe (in solids) | Fe, gms./l. | pH |
| 20 | 0.88 | 0.046 | 42.6 | 11.0 | 1.34 |
| 32 | 0.72 | 0.040 | 39.8 | 4.3 | 1.45 |
| 44 | 0.74 | 0.037 | 39.9 | 3.56 | 1.5 |
| 56 | 0.66 | 0.034 | 39.2 | 0.78 | 2.15 |
| 68 | 0.63 | 0.035 | 38.3 | 0.72 | 2.0 |
| 80 | 0.64 | 0.035 | 37.9 | 0.94 | 2.0 |

The above results indicate the action of sodium carbonate as an iron deposition agent and show the course of the leach with a relatively low quantity of sulphuric acid.

While the invention has been illustrated in the foregoing examples as applied to the treatment of nickel bearing laterite ores, it is obvious that it applies equally as well to beneficiated nickel bearing laterite ores and other Ni bearing ores or beneficiated ores or smelter or roaster products where the nickel is associated with iron and susceptible to leaching with sulphuric acid (herein referred to as "nickel mineral treated products").

EXAMPLE X

This example illustrates the effect of using increased amounts of sodium chloride in the initial leach liquor.

Following the same procedure as in the preceding examples with a lateritic nickel ore having a head value of 0.70% nickel and 0.089% cobalt and using a leaching temperature of 95 to 98° C., periodic samples of the liquor and residue were taken and analyzed to indicate the progress of the leach.

The results were as follows:

| | Residue analysis | | | | | | |
|---|---|---|---|---|---|---|---|
| Leach test number | 14 | 15 | 16 | 17 | 18 | 19 | 20 |
| Lbs. NaCl per ton ore | 15 | 30 | 45 | 60 | 75 | 90 | 100 |
| After 18 hrs., percent: | | | | | | | |
| Ni | 0.43 | 0.41 | 0.38 | 0.45 | 0.38 | 0.37 | 0.37 |
| Co | 0.031 | 0.030 | 0.027 | 0.026 | 0.027 | 0.028 | 0.027 |
| After 42 hrs., percent: | | | | | | | |
| Ni | 0.385 | 0.335 | 0.305 | 0.275 | 0.280 | 0.275 | 0.295 |
| Co | 0.031 | 0.030 | 0.027 | 0.025 | 0.206 | 0.025 | 0.0235 |
| After 66 hrs., percent: | | | | | | | |
| Ni | 0.338 | 0.32 | 0.26 | 0.24 | 0.212 | 0.212 | 0.21 |
| Co | 0.025 | 0.025 | 0.020 | 0.020 | 0.015 | 0.017 | 0.017 |
| After 90 hrs., percent: | | | | | | | |
| Ni | 0.29 | 0.28 | 0.24 | 0.20 | 0.20 | 0.19 | 0.19 |
| Co | 0.025 | 0.025 | 0.018 | 0.019 | 0.012 | 0.015 | 0.015 |
| After 114 hrs., percent: | | | | | | | |
| Ni | 0.26 | 0.24 | 0.21 | 0.18 | 0.17 | 0.16 | 0.15 |
| Co | 0.022 | 0.022 | 0.016 | 0.017 | 0.010 | 0.012 | 0.013 |
| Overall extraction: | | | | | | | |
| Ni [1] | 62.9 | 65.7 | 70.0 | 74.2 | 75.7 | 77.1 | 78.6 |
| Co [1] | 75.3 | 75.3 | 82.0 | 80.9 | 88.8 | 86.5 | 86.5 |
| Heads, percent: | | | | | | | |
| Ni | 0.70 | | | | | | |
| Co | 0.089 | | | | | | |

[1] Percentages based on head and residue analysis.

The quality of the leach liquors produced and the effect of the iron precipitation steps is presented in the following table.

| | Solution analyses | | | | | | |
|---|---|---|---|---|---|---|---|
| Leach test number | 14 | 15 | 16 | 17 | 18 | 19 | 20 |
| After 18 hrs.: | | | | | | | |
| Ni, g.p.l | 1.68 | 1.34 | 1.42 | 1.59 | 1.30 | 1.38 | 1.2 |
| Fe, g.p.l | | | | | | | |
| After 42 hrs.: | | | | | | | |
| Ni, g.p.l | 1.69 | 1.42 | 1.53 | 1.80 | 1.68 | 1.82 | 1.6 |
| Fe, g.p.l | 20.88 | 13.99 | 10.35 | 8.38 | 5.69 | 4.50 | 4.2 |
| After 66 hrs.: | | | | | | | |
| Ni, g.p.l | 1.56 | 1.53 | 1.79 | 2.01 | 1.65 | 1.85 | 1.6 |
| Fe, g.p.l | 17.15 | 9.40 | 7.33 | 5.85 | 3.41 | 2.87 | 2.6 |
| After 90 hrs.: | | | | | | | |
| Ni, g.p.l | 1.76 | 1.49 | 1.67 | 1.93 | 1.65 | 1.57 | 1.7 |
| Fe, g.p.l | 14.14 | 6.70 | 4.60 | 3.80 | 2.60 | 2.21 | 2.4 |
| After 114 hrs.: | | | | | | | |
| Ni, g.p.l | 1.93 | 1.60 | 2.01 | 2.09 | 2.03 | 1.94 | 1.9 |
| Fe, g.p.l | 10.92 | 5.92 | 4.50 | 3.25 | 2.58 | 2.13 | 2.1 |

This table shows the effect of the use of sodium chloride with sulphuric acid at a temperature of about 95° C. wherein with the use of increasing amounts of sodium chloride not only is there an increase in nickel and cobalt in solution, but also the added effect of precipitation of iron that has gone into solution.

Particularly noteworthy in the solution analyses is the apparent differential effect on the iron precipitation which occurs with increasing amounts of sodium chloride.

EXAMPLE XI

This example shows the effect on pressure leaching using sodium chloride and sulphuric acid at in excess of 100° C. In this case three tests were run at a temperature of 200° C. in a laboratory pressure leaching apparatus wherein the natural presssure developed at this temperature was about 275 p.s.i.g. Using the same amount of sodium chloride in each test, that is, 50 lbs. per ton, and varying the acid input from 313 lbs. per ton in the first test to 628 lbs. per ton in the second test, and 1027 lbs. per ton in the third test, at the end of 24 hours leaching time under these conditions the percentage of the nickel in solution using 313 lbs. of sulphuric acid per ton of solids was 40%, and the cobalt, 78%.

At 628 lbs. sulphuric acid per ton and at 24 hours leaching time, the nickel in solution was 85% and the cobalt, 92%. In using 1027 lbs. sulphuric acid per ton, at the end of the 24 hour period the nickel in solution was 96%, and the cobalt, 93½%.

In using the pressure leaching instead of atmospheric pressure, I prefer to add additional precipitation salts such as sodium carbonate and potassium carbonate to the pulp and condition at atmospheric pressure at a temperature of from about 50° C. to the atmospheric boiling point of the pulp for a minimum period of 8 hours.

EXAMPLE XII

In this example an old plant copper tailings were used in exactly the same equipment and under the same conditions as in Example X. The head value was 0.33% total copper, and 0.25% copper as shown to be acid soluble in sulphuric acid alone by the standard method of analysis. The folowing test is the optimized of the series. This optimized test was run under the following conditions:

Pulp temperature _____ 70° C.
Sodium chloride _____ 20 lbs. per ton.
Sulphuric acid addition _____ 45 lbs. per ton.

At the end of 8 hours leaching time, the final tailings analyzed 0.22% total copper, showing outstanding dissolution is not only the acid soluble copper, but also of the original copper content that was not acid soluble in the use of sulphuric acid alone. It was found that the minimum temperature for acceptable dissolution of the copper minerals was 50° C.

EXAMPLE XIII

The following three series of tests were carried out on the tailings from an old copper plant flotation circuit. Conventional leaching tests gave poor metallurgical results with recoveries in the range of 50–55% of the contained copper values. The chemical analysis of these tailing was 0.33% total copper, and 0.24% acid soluble copper. The sulphide copper is taken as the difference between these two analysis, that is, 0.09% copper. All of the following tests were carried out in the same leach bath type of equipment as previously described.

Series I

In this series of tests the tailings samples were pre-dispersed with varying amounts of sodium silicate, and then leached with sulphuric acid. The leaching time was 3 hours, the sulphuric acid addition 42 lbs. per ton, and the temperature 65° C. in all tests.

| Pounds per ton sodium silicate: | Percent of total copper placed in solution |
|---|---|
| 0.0 | 75.6 |
| 1.0 | 79.0 |
| 2.0 | 81.0 |
| 4.0 | 82.6 |
| 6.0 | 80.0 |

The graphed metallurgy showed that the optimum of sodium silicate was 3.5 lbs. per ton with 82.8% of the total copper in solution. Thus, in using a dispersion agent prior to the leaching cycle, the amount is reasonably critical and should be controlled within narrow limits for optimum results.

Where the optimum amount of sodium silicate is used as a dispersant in the presence of a sufficient sodium ion the increase in recovery is outstanding, as is indicated in the Series II test which follows. In some applications where sufficient sodium ion is present by virtue of the use of the optimum amount of sodium silicate as a dispersant it may be economically desirable simply to pre-disperse the material to be treated and then to leach with the addition of acid only.

Series II

This series of tests combines both the predispersion of the pulp with sodium silicate, and increasing the concentration of sodium ion present by the addition of sodium chloride in various amounts. All of the following tests were carried out using 4.0 lbs. per ton sodium silicate, 52 lbs. per ton $H_2SO_4$, a temperature of 70° C., and a leaching cycle of 6 hours.

The sodium chloride was varied from 4.0 lbs. to 12.0 lbs. per ton.

| Pounds per ton sodium chloride: | Percent of total copper placed in solution |
|---|---|
| 4 | 88.6 |
| 6 | 90.0 |
| 8 | 90.5 |
| 10 | 91.2 |
| 12 | 91.2 |

It will be noted that in using sodium chloride to increase the sodium ion concentration, extraction is improved.

In using sodium chloride in combination with a dispersant as above, the minimum amount for optimum metallurgy has been found to be 6.0 lbs. per ton.

The minimum temperature for acceptable leaching time cycles is 50° C. No upper limit of temperature has been determined. This tempearture will be a function of leaching time and at temperatures in excess of about 100° C. will of necessity be in enclosed vessels, and develop various natural pressures, dependent on the ultimate temperature used.

In this series of tests the copper in solution varied from 2.0 to 2.2 grams per liter, and iron from 1.5 to 1.7 grams per liter.

Series III

In this series of tests varying amounts of sodium chloride alone were used as the sodium ion producing agent. The conditions of all tests were, using 45 lbs. per ton of $H_2SO_4$, temperature of 70° C., and 6 hours leaching time cycle.

| Pounds per ton sodium chloride | Percent of total copper placed in solution |
|---|---|
| 0.0 | 84.3 |
| 10 | 85.4 |
| 15 | 87.3 |
| 20 | 87.6 |
| 25 | 87.9 |
| 30 | 88.3 |

It will be noted that the break in the recovery curve takes place on the addition of between 10 to 15 lbs. per ton of NaCl. At 30 lbs. of NaCl per ton the tailings analyzed 0.037% total copper and 0.008% acid soluble copper, leaving 0.029% as presumably sulphide copper. As the heads contained 0.09% acid soluble copper, the dissolution of the sulphide copper can probably be attributed to the combination of the sodium ion and oxidation of these old plant tailings in the tailings dump.

In other applications where valuable sulphide minerals are present, and where preoxidation has not taken place, the use of oxidizing agents such as oxygen, potassium dichromate, and potassium perchlorate, either prior to or during the leach may assist the dissolution of the sulphides.

While the invention has been illustrated in Examples XII and XIII as applicable to old plant copper tailings it is obvious that it applies generally to copper and copper nickel materials and tailings where the copper and nickel are associated with iron and susceptible to leaching with sulphuric acid.

The following series of examples were tests carried out on a lateritic nickel bearing ore high in magnesia content.

In the examples where the temperature was sufficiently high for the pulp to boil, the individual test pots were equipped with water-cooled condensers that returned the condensate directly to its individual pot.

The same thermostatically controlled leach bath was used as in the previous examples.

The ore sample was dried at 110° C., crushed to minus ¼ inch, and 800-gram charges ground in a laboratory rod mill at 45% solids.

The fineness of the grind was 95 to 100% minus 35 mesh.

Following the grind the pulp was transferred from the rod mill to the individual leaching pot at a density of about 40% solids.

In each case either a wetting agent, and up to 4 lbs. per ton of solids of sulphuric acid was added to the rod mill, or the sulphuric acid alone, to improve the flow-ability of the pulp.

In addition, by lowering the pH of the pulp during grinding to below a pH of 7.0, there is a surprising beneficial effect on the thickening characteristics of the pulp. This can be a most important factor in plant practice where following grinding of the ore to the suitable degree for effective leaching, the pulp may be thickened and the density to leaching controlled at the desired percent solids. My preferred pH range in the grinding circuit is about 4.0 to 7.0. If the pH is too acidic the steel grinding media and mill liner consumption will increase appreciably.

On the upper end of the range the pH at the head of the grinding circuit may be as low as about 4.0 and due to the acid consuming constituents in the ore, rise to about 7.0 at the discharge point in the circuit.

I prefer to carry out the preparation of the pulp for leaching at temperatures lower than the atmospheric boiling point of the pulp, in order to hold maintenance of the equipment at a reasonable level.

It will be appreciated that a small percentage of the nickel may go into solution during its preparation, particularly if the pH is maintained below about 5.0. The following was the head analysis of the sample tested in all of the following examples.

|  | Percent by weight |
|---|---|
| Ni | 2.60 |
| Co | 0.08 |
| Fe | 18.8 |
| MgO | 14.9 |
| $SiO_2$ | 39.6 |
| $Al_2O_3$ | 2.83 |
| $Cr_2O_3$ | 1.65 |
| LoI | 9.7 |

EXAMPLE XIV

Reagents to rod mil—

| Reagent | Lbs./ton solids |
|---|---|
| Tri-methyl nonyl polyethylene glycol ether (TNPGE) | 0.01 |
| $H_2SO_4$ | 5.0 |

Leach temperature, 90° C.

The following table shows the reagents to the leach and the metallurgical results obtained. In each test the potassium chloride (KCl) and sodium chloride (NaCl) were added prior to the sulphuric acid. In each test 990 lbs. of $H_2SO_4$ was added at the beginning of the leach, and the solids and leach solution were sample at 20 hours following the $H_2SO_4$ addition.

| | | | Sample assays | | | | |
|---|---|---|---|---|---|---|---|
| | Lbs./ton | | Solids, | Solutions, grams/litre | | | pH at |
| | NaCl | KCl | Ni | Ni | Fe | Cr | 20 hrs. |
| Test Number: | | | | | | | |
| 12 | 110 | 30 | 0.67 | 11.6 | 5.7 | 0.27 | 1.5 |
| 13 | 120 | 30 | 0.64 | 12.4 | 5.4 | 0.29 | 1.4 |
| 14 | 130 | 30 | 0.59 | 12.2 | ¹4.9 | 0.38 | 1.2 |
| 16 | 0 | 40 | 0.79 | 10.5 | 14.7 | 0.36 | 1.2 |
| 17 | 0 | 60 | 0.72 | 11.6 | 8.7 | 0.32 | 1.2 |
| 18 | 0 | 80 | 0.69 | 10.8 | 5.5 | 0.27 | 1.4 |
| 19 | 0 | 100 | 0.65 | 12.0 | 4.9 | 0.09 | 1.5 |
| 20 | 0 | 120 | 0.60 | 12.2 | ¹4.2 | 0.07 | 1.5 |

¹ Calculated.

The results of this series of tests were surprising in several respects.

Where NaCl was used in combination with KCl, as the quantity of NaCl was increased not only is there a marked increase in the nickel recovery and a reduction of the iron in solution, but conversely an increase of the chrome in solution. As the chrome in solution may interfere with the recovery of the nickel and cobalt from solution, where it is necessary to reduce the chrome below 0.1 gram per liter it will be necessary to raise the KCl ratio to NaCl.

Where KCl is used alone, as the KCl is raised in quantity not only is there a marked increase in nickel recovery, but also a marked decrease of both iron and chrome in solution. The break in the curve reducing the chrome in solution to less than 0.1 gram per liter is between 80 to 100 lbs. KCl per ton of ore.

The lateritic nickel bearing ores have a wide variance in chemical composition. For instance, the iron content varies from about 8% to 45%.

Similarly, there is a large variance in silica, alumina, and magnesia content.

For this reason, in using my process wherein the optimum sodium ion is used alone, or potassium ion alone, or a combination of the two, and wherein my economic preferred salts are sodium and potassium chloride to supply these ions, their optimum quantities may vary considerably. The following table shows the minimum and maximum quantities when used alone.

| Lbs. per ton ore when used alone | | | |
|---|---|---|---|
| NaCl | | KCl | |
| Min. | Max. | Min. | Max. |
| 59 | 350 | 25 | 200 |

My preferred range in using NaCl in combination with KCl is about 50 to 200 lbs. NaCl per ton solids, and about 10 to 160 lbs. KCl per ton solids.

In treating nickel bearing manganese-iron sea deposit nodules the same minimums apply in using NaCl or KCl alone, or in combination. The maximums, to obtain optimum economic recovery, are lower.

Where I use sea water as part or all of the make-up solution I prefer to adjust the pulp density to the major economic point making the maximum use of the contained NaCl. For instance, if I require 200 lbs. NaCl per ton solids, and I use sea water containing 60 lbs. NaCl per ton of sea water, I would use 3 tons of sea water to one ton of solids, resulting in 180 lbs. of NaCl per ton solids. To raise the NaCl content to 200 lbs. NaCl per ton solids, it would also be necessary to add 20 lbs. NaCl per ton solids.

Such a mixture would be 25% solids, which density is in the lower end of the range for effective leaching in my process taking into consideration heat requirements and size of leaching tanks required.

My preferred pulp density range is 25% to 60% solids.

EXAMPLE XV

The following series of tests shows the comparative metallurgy using NaCl alone, KCl alone, combined NaCl and KCl, and the effect of the introduction of ferric ions into the pulp.

In all of the tests 1080 lbs. $H_2SO_4$ was added to the pulp at the beginning of the leach and following the addition of the salts. The temperature of the leach was 90° C. and the pulp was sampled at 20.5, 45 and 67.5 hours after the sulphuric acid addition.

For comparative purposes the 67.5 hour sample only is shown.

| | | | Sample assays | | | |
|---|---|---|---|---|---|---|
| | Lbs./ton | | | Solutions g./l. | | |
| Test No. | NaCl | KCl | Ferric oxide | Solids, Ni | Ni | Fe | pH at 67.5 hrs. |
| 40 | 0 | 140 | 0 | 0.37 | 10.7 | 1.95 | 2.25 |
| 41 | 160 | 0 | 0 | 0.41 | 10.6 | 4.05 | 1.70 |
| 42 | 160 | 30 | 0 | 0.40 | 10.2 | 3.83 | 1.80 |
| 47 | 160 | 30 | 1.85 | 0.40 | 11.1 | 2.82 | 1.70 |

It will be noted that in using KCl alone, not only is the nickel in the solids the lowest, but also the iron in solution is the lowest.

In the use of a small quantity of ferric oxide, that is, only 1.85 lbs. per ton of solids, a most surprising effect is the reduction of iron in solution.

Its comparative test is 42. This effect of the ferric ion is not understood.

EXAMPLE XVI

In the following series of tests the leach pots were equipped with condensers to return condensate to the individual leach pots. The temperature of the oil bath was 114° C. which was appreciably higher than the boiling point of the pulp. The NaCl and KCl were added prior to the sulphuric acid.

The temperature in the leach pots was 96° to 98° C. which was the boiling temperature range of the pulps. There is a surprising high rate of dissolution of nickel and cobalt in the boiling temperature range of various pulps. This temperature range will vary from about 95° C. to 105° C. depending on the salt concentration used and the altitude.

In the first series of tests the sulphuric acid was stage-added and the pH of the pulp lowered to below 1.5 with sulphuric acid on the second addition following 20 hours leaching time.

Where the leaching of nickel and cobalt values is carried out at temperatures in the range of 70° C. to the atmospheric boiling temperature of the pulp, or alternately, under pressure from the atmospheric boiling point to higher temperatures under pressure, I prefer to use a minimum time period of 8 hours for further leaching following the lowering of the pH of the pulp below 1.5 with sulphuric acid.

In the second series of tests the NaCl and KCl were added to the pulp prior to the sulphuric acid, and the sulphuric acid added in a single stage at the beginning of the leach.

In conditioning the leach under atmospheric pressure and in the boiling temperature range of the pulp, the rapid dissolution of the nickel values are shown in Test 66 where in excess of 90% of the nickel values were placed in solution in 17 hours leaching time.

The leaching time was carried out to 100 hours to determine the ultimate possible recovery.

In using temperatures higher than the boiling point of the pulp and with at least part of the leach carried out under pressure the rate of leaching time may be appreciably reduced, and in some cases, even though maintenance becomes a major factor, can be economically justified.

In such cases a maximum temperature of about 200° C. and 275 p.s.i.g. will bring the leaching time down to less than about 24 hours.

Where pressure leaching is used in the first stage, following the pressure leach I prefer to condition the pulp for a minimum period of 8 hours at atmospheric pressure and temperatures below the boiling point of the pulp in the presence of sufficient quantity of at least one salt selected from the group of NaCl and KCl. I prefer to have at least the major part of the salt present during the pressure leaching stage.

In all of the tests, with the exception of Test 65, 140 lbs. of NaCl and 40 lbs. of KCl per ton of ore respectively were added to the pulp following grinding and prior to the initial $H_2SO_4$ addition. In Test 65 no salt addition was made to the pulp.

| Test number | Lbs./ton $H_2SO_4$ Initial | Lbs./ton $H_2SO_4$ After 20 hrs. | Time, hrs. | Solids Ni | Solids Co | Solutions, grams/litre Ni | Solutions, grams/litre Fe | pH Time | pH |
|---|---|---|---|---|---|---|---|---|---|
| 60 | 590 | 590 | 17 | 1.37 | 0.006 | 5.4 | 2.4 | 17 | 3.4 |
|    |     |     | 41 | 0.17 |       | 11.3 | 6.7 | 44 | 1.3 |
|    |     |     | 100 | 0.10 |      | 11.9 | 4.5 | 100 | 1.75 |
| 61 | 660 | 520 | 17 | 1.16 | 0.005 | 6.0 | 3.8 | 17 | 3.25 |
|    |     |     | 41 | 0.13 |       | 10.8 | 8.6 | 44 | 1.1 |
|    |     |     | 100 | 0.08 |      | 12.0 | 6.3 | 100 | 1.75 |
| 63 | 790 | 390 | 17 | 0.82 | 0.005 | 7.8 | 4.8 | 17 | 2.5 |
|    |     |     | 41 | 0.14 |       | 10.7 | 7.5 | 44 | 1.3 |
|    |     |     | 100 | 0.09 |      | 11.3 | 4.9 | 100 | 1.8 |
| 64 | 860 | 320 | 17 | 0.70 | 0.005 | 8.1 | 5.3 | 17 | 2.1 |
|    |     |     | 41 | 0.14 |       | 13.6 | 9.6 | 44 | 1.2 |
|    |     |     | 100 | 0.10 |      | 14.6 | 6.7 | 100 | 1.9 |
| 65 | [1] 1,128 |  | 17 | 0.74 | 0.010 | 8.6 | 34.8 | 20 | 1.45 |
|    |     |     | 41 | 0.63 |       | 7.8 | 30.5 | 44 | 1.35 |
|    |     |     | 100 | 0.63 |      | 8.9 | 30.2 | 100 | 3.0 |
| 66 | 1,128 |  | 17 | 0.24 | 0.005 | 10.0 | 7.7 | 20 | 1.5 |
|    |     |     | 41 | 0.20 |       | 9.5 | 5.9 | 44 | 1.65 |
|    |     |     | 100 | 0.15 |      | 10.8 | 3.9 | 100 | 2.05 |
| 68 | [2] 1,128 |  | 17 | 0.24 | 0.006 | 12.6 | 8.5 | 20 | 1.55 |
|    |     |     | 41 | 0.20 |       | 15.9 | 8.8 | 44 | 1.70 |
|    |     |     | 100 | 0.16 |      | 15.2 | 4.2 | 100 | 1.9 |
| 69 | [3] 1,128 |  | 17 | 0.23 | 0.006 | 11.2 | 7.5 | 20 | 1.55 |
|    |     |     | 41 | 0.20 |       | 11.6 | 6.9 | 44 | 1.65 |
|    |     |     | 100 | 0.145 |     | 12.1 | 3.7 | 100 | 1.65 |

[1] No salts to pulp.
[2] In addition to NaCl and KCl, 6.25 lbs. of ferrous sulphate was added to the pulp prior to the $H_2SO_4$ addition.
[3] In addition to NaCl and KCl, 6.25 lbs. of ferric chloride was added to the pulp prior to the $H_2SO_4$ addition.

In comparing the results of Tests 65 and 66 where all leach conditions were the same with the exception that Test 66 had present in the pulp 140 lbs. of NaCl and 40 lbs. KCl per ton respectively, while Test 65 had no addition of Na or K ion, it will be noted that in Test 65 the unleached Ni remaining in the solids was 0.63% as against 0.15% in Test 66, indicating that the Na and K ion are not only acting as an effective agent for the iron precipitation but also as a dissolution agent for the nickel and cobalt.

The cobalt tailing in Test 65 was 100% higher than in Test 66 and the final Fe in solution in Test 65 was approximately 750% higher than in Test 66.

A surprising result from this series of tests was the rapid dissolution of the nickel minerals where the leach was carried out at atmospheric pressure and in the boiling temperature range of the pulp. It will be noted that in Tests 66 to 68 inclusive, in excess of 90% of the nickel values were placed in solution in 17 hours' leach time.

Where comparatively low pressure leaches are used and temperatures in the range of about 95° to 200° C., the leaching time for dissolution of a minimum of 90% of the nickel values would be less than 12 hours. The maximum pressure at 200° C. would be about 275 p.s.i.g.

As the rate of dissolution of the nickel will be a function of temperature, economically, it is doubtful that temperatures in excess of about 300° C. could be justified, as the major portion of the nickel would be in solution in less than about 4 hours. For the combined leaching of the nickel and cobalt values and acceptable precipitation of the iron in solution, the minimum time of the process is about 8 hours and the maximum about 120 hours.

With copper bearing materials the minimum time period of the process is about 2 hours, and the maximum about 48 hours.

It will be appreciated that the pregnant solution containing the nickel and cobalt values may be separated from the impoverished solids by conventional methods such as filtration, and recovered by well known processes such as hydrogen sulphide precipitation of the nickel.

I claim:

1. A hydrometallurgical process for the leaching of at least one mineral from the group of minerals consisting of nickel, cobalt and copper, and from the group of materials consisting of lateritic nickel and cobalt bearing ores, sea deposit nodules containing nickel and copper minerals, copper ores containing sulphuric acid soluble copper minerals, and flotation plant tailings containing sulphuric acid soluble copper minerals comprising; forming a pulp of the said material at a pulp density of from about 25 to 60% solids and wherein the said material is in the fineness range of from about 28 mesh to about 90% minus 325 mesh; reducing the pH of the said pulp to below 1.5 with at least one sulphuric acid addition; conditioning said pulp in a temperature range of from about 50° C. to 300° C. in the presence of at least one iron precipitating agent selected from the group of agents consisting of sodium chloride and potassium chloride and wherein the said agent has been added to the pulp in sufficient quantity to cause substantinal precipitation of iron in solution concurrently with dissolution of the said nickel, cobalt and copper minerals, and wherein said conditioning is carried out for a sufficient period of time whereby to produce a pregnant solution enriched in said mineral values and low in iron content and a solids tailings product impoverished in said mineral values.

2. A hydrometallurgical process for the leaching of sulphuric acid soluble copper minerals from the group of materials consisting of copper ores, copper mineral treated products and flotation plant tailings comprising: forming a pulp of the said material at a pulp density of from about 25 to 60% solids and wherein the said material is in the fineness range of about 28 mesh to about 90% minus 325 mesh; reducing the pH of the said pulp to below 1.5 with at least one sulphuric acid addition; conditioning said pulp in a temperature range of 50° C. to 300° C. in the presence of at least one iron precipitating agent selected from the group of agents consisting of, sodium chloride and potassium chloride and wherein the said agent has been added to the pulp in sufficient quantity to cause substantial precipitation of iron in solution concurrently with dissolution of said copper values and wherein said conditioning is carried out for a sufficient period of time whereby to produce a pregnant solution enriched in said copper values and low in iron content, and a solids tailings product impoverished in said copper values.

3. The process of claim 2 wherein the said temperature range is from about 50° C. to 105° C.

4. The process of claim 2 wherein at least one of the said iron precipitating agents is potassium chloride.

5. The process of claim 2 wherein prior to reducing the pH of the said pulp to below 1.5 the solids in the said pulp are dispersed with the addition of a dispersing agent.

6. The process of claim 2 wherein the said precipitating agent is sodium chloride.

7. The process of claim 2 wherein the said iron precipitating agent is sodium chloride and wherein the amount added to the said pulp is in the range of from about 4 lbs. to about 30 lbs. per ton of solids.

8. A hydrometallurgical process for the leaching of nickel minerals from the group of ores consisting of laterites and manganese-iron sea deposit nodules comprising: comminuting the ore in a wet grinding circuit to a fineness in the range of from about 28 mesh to about 90% minus 325 mesh; subsequently forming a suspension of the said comminuted ore at a pulp density in the range of from about 25 to 60% solids; reducing the pH of the said pulp to below 1.5 with at least one sulphuric acid addition; conditioning said pulp in a temperature range of from about 70° C. to about 300° C. in the presence of at least one iron precipitating agent selected from the group of agents consisting of sodium chloride and potassium chloride and wherein the said iron precipitating agent has been added to the pulp in sufficient quantity to cause substantial precipitation of the iron in solution concurrently with dissolution of the said nickel minerals and wherein said conditioning is carried out for a sufficient period of time whereby top roduce a pregnant solution enriched in nickel values and low in iron content, and a solids tailings product impoverished in nickel values.

9. The process of claim 8 wherein during said comminution the pH of the pulp has been lowered with sulphuric acid to within the pH range of about 4.0 to 7.0.

10. The process of claim 8 wherein the said temperature of the said pulp during the leach is in the range of from about 95° C. to about 105° C.

11. The process of claim 8 wherein at least one of the said iron precipitating and nickel dissolution agents is sodium chloride and wherein the said agent has been selected from the group consisting of sodium chloride and sea water and wherein the amount added to the said pulp is in the range of from about 50 lbs. to about 350 lbs. per ton of solids.

12. The process of claim 8 wherein the said sufficient period of time is in the range of from about 8 hours to 120 hours.

13. The process of claim 8 wherein at least one of the said iron precipitating and nickel dissolution agents is potassium chloride and wherein the amount added to the said pulp is in the range of from about 10 lbs. to about 200 lbs. per ton of solids.

14. The process of claim 8 wherein during at least part of the leach carbon dioxide is fed into the said pulp.

15. The process of claim 14 wherein the said carbon dioxide is a waste combustion gas.

16. The process of claim 8 wherein ferric chloride is present in the pulp during at least part of the leach.

17. The process of claim 16 wherein a minimum of 5.0 lbs. per ton of the said ferric chloride has been added to the pulp.

18. The process of claim 8 wherein at least part of the said leaching process is carried out in the temperature range of about 95° C. to 200° C. and under a maximum pressure of about 275 p.s.i.g.

References Cited

UNITED STATES PATENTS

| | | | |
|---|---|---|---|
| 913,708 | 3/1909 | Dow et al. | 423—140 X |
| 1,193,734 | 8/1916 | Sulman et al. | 75—115 X |
| 2,719,082 | 9/1955 | Sproule et al. | 75—119 X |
| 2,754,174 | 7/1956 | Roberts | 423—140 X |
| 2,831,751 | 4/1958 | Birner | 423—140 |
| 3,130,043 | 4/1964 | Lichty | 423—140 X |
| 3,434,947 | 3/1969 | Steintveit | 423—140 X |
| 3,367,740 | 2/1968 | Zubryckyj et al. | 423—150 |
| 3,466,144 | 9/1969 | Kay | 423—150 X |
| 3,637,371 | 1/1972 | Mackin et al. | 75—101 R |

HERBERT T. CARTER, Primary Examiner

U.S. Cl. X.R.

75—115, 108, 117, 119; 423—41, 140, 143, 146, 150, 34

UNITED STATES PATENT OFFICE
CERTIFICATE OF CORRECTION

Patent No. 3,793,430          Dated February 19, 1974

Inventor(s) David Weston

It is certified that error appears in the above-identified patent and that said Letters Patent are hereby corrected as shown below:

The term of this patent subsequent to

Feb. 19, 1991, has been disclaimed.

Signed and sealed this 1st day of April 1975.

(SEAL)
Attest:

RUTH C. MASON
Attesting Officer

C. MARSHALL DANN
Commissioner of Patents
and Trademarks